US012432147B2

United States Patent
Mattes et al.

(10) Patent No.: US 12,432,147 B2
(45) Date of Patent: Sep. 30, 2025

(54) SYSTEMS AND METHODS FOR ROUTING DATA PACKET IN A UNIFIED WIDE AREA NETWORK

(71) Applicant: Microsoft Technology Licensing, LLC, Redmond, WA (US)

(72) Inventors: Paul David Mattes, Saint Paul, MN (US); Umesh Krishnaswamy, San Jose, CA (US); John Michael Abeln, Bellingham, WA (US); Sonal Kothari, San Jose, CA (US); Paul-Andre C. Bissonnette, Seattle, WA (US); Pappula Prabhakar Reddy, Johns Creek, GA (US); Himanshu Raj, Cupertino, CA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 196 days.

(21) Appl. No.: 18/101,291

(22) Filed: Jan. 25, 2023

(65) Prior Publication Data
US 2024/0137319 A1    Apr. 25, 2024

Related U.S. Application Data

(60) Provisional application No. 63/417,756, filed on Oct. 20, 2022.

(51) Int. Cl.
*H04L 47/125* (2022.01)
*H04L 45/00* (2022.01)
*H04L 45/50* (2022.01)

(52) U.S. Cl.
CPC ............ *H04L 47/125* (2013.01); *H04L 45/34* (2013.01); *H04L 45/50* (2013.01); *H04L 2212/00* (2013.01)

(58) Field of Classification Search
CPC ....... H04L 47/125; H04L 45/34; H04L 45/50; H04L 2212/00; H04L 12/4633;
(Continued)

(56) References Cited

U.S. PATENT DOCUMENTS 8,416,790 B1 * 4/2013 Busch ................. H04L 12/4662
370/401
8,787,400 B1 * 7/2014 Barth ...................... H04L 45/24
370/419

(Continued)

OTHER PUBLICATIONS

Segment Routing in Software Defined Networks: A Survey; IEEE Communications Surveys & Tutorials, vol. 21, No. 1, first quarter; pp. 1-23. (Year: 2018).*

(Continued)

*Primary Examiner* — Tonia L Dollinger
*Assistant Examiner* — Linh T. Nguyen
(74) *Attorney, Agent, or Firm* — Ray Quinney & Nebeker P.C.; Paul N. Taylor

(57) ABSTRACT

A method and a network for routing data packet in a unified wide area network (WAN) is provided. The method includes encapsulating a data packet by an ingress aggregation router and forwarding the encapsulated data packet to an ingress backbone router. The encapsulated data packet includes a first label. The ingress backbone router selects an optimized traffic engineered tunnel and replaces the first label with the optimized traffic engineered tunnel and forwards the encapsulated data packet along the optimized traffic engineered tunnel.

19 Claims, 5 Drawing Sheets

(58) Field of Classification Search
CPC ... H04L 45/645; H04L 45/04; H04L 12/4604; H04L 45/80
See application file for complete search history.

(56) References Cited

U.S. PATENT DOCUMENTS

| | | | |
|---|---|---|---|
| 9,455,950 B1* | 9/2016 | Li | H04L 61/251 |
| 10,027,594 B1* | 7/2018 | Seshadri | H04L 1/20 |
| 2004/0156313 A1* | 8/2004 | Hofmeister | H04L 12/4633 370/229 |
| 2012/0263185 A1* | 10/2012 | Bejerano | H04L 45/66 370/401 |
| 2015/0304206 A1* | 10/2015 | Filsfils | H04L 45/46 709/238 |
| 2019/0190818 A1* | 6/2019 | Ceccarelli | H04L 45/52 |
| 2020/0127913 A1* | 4/2020 | Filsfils | H04L 45/741 |
| 2020/0322261 A1* | 10/2020 | Hu | H04L 45/12 |
| 2021/0306265 A1* | 9/2021 | Ka | H04L 45/507 |
| 2022/0182317 A1 | 6/2022 | Thoria | |
| 2022/0286360 A1* | 9/2022 | Gali | H04L 41/40 |
| 2022/0368620 A1* | 11/2022 | Skalecki | H04L 45/12 |
| 2024/0196203 A1* | 6/2024 | Matsushima | H04L 61/5061 |

OTHER PUBLICATIONS

International Search Report and Written Opinion received for PCT Application No. PCT/US23/033319, mailed on Nov. 24, 2023, 18 pages.
"Information Technology—Telecommunications and Information Exchange Between Systems—Intermediate System to Intermediate System Intra-Domain Routeing Information Exchange Protocol for Use in Conjunction with The Protocol for Providing the Connectionless", Retrieved From: https://www.iso.org/standard/30932.html, Nov. 2002, 8 Pages.
Awduche, et al., "RSVP-TE: Extensions to RSVP for LSP Tunnels", Retrieved From: https://datatracker.ietf.org/doc/rfc3209/, Dec. 2001, 54 Pages.
Bogle, et al., "TeaVaR: Striking the Right Utilization-Availability Balance in WAN Traffic Engineering", In Proceedings of the ACM Special Interest Group on Data Communication, Aug. 19, 2019, pp. 29-43.
Caesar, et al., "Design and Implementation of a Routing Control Platform", In Proceedings of USENIX NSDI, May 2, 2005, pp. 15-28.
Claise, et al., "Specification of the IP Flow Information Export (IPFIX) Protocol for the Exchange of Flow Information", Retrieved From: https://datatracker.ietf.org/doc/rfc7011/, Sep. 2013, 65 Pages.
Elwalid, et al., "MATE: MPLS adaptive traffic engineering", In Proceedings of IEEE Infocom, vol. 3, Apr. 22, 2001, pp. 1300-1309.
Feamster, et al., "Guidelines for interdomain traffic engineering", In Journal of ACM SIGCOMM Computer Communication Review, vol. 33, Issue 5, Oct. 1, 2003, pp. 19-30.
Feldmann, et al., "Deriving Traffic Demands for Operational IP Networks: Methodology and Experience", In Journal of IEEE/ACM Transactions on Networking, vol. 9, Issue 3, Jun. 2001, pp. 265-279.
Fernandez, et al., "Building Express Backbone: Facebook's New Long-Haul Network", Retrieved From: https://engineering.fb.com/2017/05/01/data-center-engineering/building-express-backbone-facebook-s-new-long-haul-network/, May 1, 2017, 15 Pages.
Filsfils, et al., "Segment Routing Architecture", Retrieved From: https://datatracker.ietf.org/doc/rfc8402/, Jul. 2018, 29 Pages.
Forrest, John, "Coin-OR linear programming solver", Retrieved From: https://github.com/coin-or/Clp, Jan. 12, 2022, 9 Pages.
Goldberg, et al., "Network flow algorithms", In Journal of Springer Verlag, vol. 9, 1990, pp. 101-164.
Gupta, et al., "SDX: A Software Defined Internet Exchange", In Proceedings of ACM SIGCOMM, Aug. 14, 2014, pp. 551-562.
Hong, et al., "Achieving High Utilization with Software-Driven WAN", In Proceedings of ACM SIGCOMM, Aug. 27, 2013, pp. 15-26.
Hong, et al., "B4 and after: managing hierarchy, partitioning, and asymmetry for availability and scale in google's software-defined WAN", In Proceedings of ACM SIGCOMM, Aug. 7, 2018, pp. 74-87.
Jain, et al., "B4: Experience with a Globally-Deployed Software Defined WAN", In Proceedings of ACM SIGCOMM, Aug. 27, 2013, pp. 3-14.
Jin, et al., "Dynamic Scheduling of Network Updates", In Proceedings of ACM SIGCOMM, Aug. 17, 2014, pp. 539-550.
Kandula, et al., "Calendaring for Wide Area Networks", In Proceedings of ACM SIGCOMM, Aug. 17, 2014, pp. 515-526.
Kandula, et al., "Walking the Tightrope: Responsive Yet Stable Traffic Engineering", In Proceedings of ACM SIGCOMM, Aug. 22, 2005, pp. 253-264.
Katz, et al., "Bidirectional Forwarding Detection", Retrieved From: https://www.rfc-editor.org/rfc/rfc5880.html, Jun. 2010, 46 Pages.
Krishnaswamy, et al., "Decentralized Cloud Wide-Area Network Traffic Engineering with Blastshield", In Proceedings of USENIX NSDI, Apr. 4, 2022, pp. 325-338.
Kumar, et al., "Semi-Oblivious Traffic Engineering: The Road Not Taken", In Proceedings of USENIX NSDI, Apr. 9, 2018, pp. 157-170.
Laoutaris, et al., "Inter-Datacenter Bulk Transfers with NetStitcher", In Proceedings of ACM SIGCOMM, Aug. 15, 2011, pp. 74-85.
Liu, et al., "Traffic Engineering with Forward Fault Correction", In Proceedings of ACM SIGCOMM, Aug. 17, 2014, pp. 527-538.
Medina, et al., "Traffic Matrix Estimation: Existing Techniques and New Directions", In Proceedings of ACM SIGCOMM, Aug. 19, 2002, pp. 161-174.
Mitra, et al., "A Case Study of Multiservice, Multipriority Traffic Engineering Design for Data Networks", In Proceedings of IEEE Globecom, Dec. 5, 1999, pp. 1077-1083.
Mizux, "OR-Tools—Google Optimization Tools", Retrieved From: https://github.com/google/or-tools, Nov. 28, 2022, 8 Pages.
Nygren, et al., "OpenFlow Switch Specification", Retrieved From: https://opennetworking.org/wp-content/uploads/2014/10/openflow-switch-v1.5.1.pdf, Mar. 26, 2015, 283 Pages.
Pan, et al., "Fast Reroute Extensions to RSVP-TE for LSP Tunnels", Retrieved From: https://datatracker.ietf.org/doc/rfc4090/, May 2005, 34 Pages.
Phaal, et al., "sFlow Version 5", Retrieved From: https://sflow.org/sflow_version_5.txt, Jul. 2004, 49 Pages.
Rosen, et al., "Multiprotocol Label Switching Architecture", Retrieved From: https://www.rfc-editor.org/rfc/rfc3031, Jan. 2001, 57 Pages.
Roughan, et al., "Traffic Engineering with Estimated Traffic Matrices", In Proceedings of the 3rd ACM SIGCOMM Conference on Internet Measurement, Oct. 27, 2003, pp. 248-258.
Schlinker, et al., "Engineering Egress with Edge Fabric: Steering Oceans of Content to the World", In Proceedings of ACM SIGCOMM, Aug. 7, 2017, pp. 418-431.
Singh, et al., "Cost-effective Cloud Edge Traffic Engineering with Cascara", In Proceedings of USENIX NSDI, Apr. 12, 2021, pp. 201-216.
Wang, et al., "COPE: Traffic Engineering in Dynamic Networks", In Proceedings of ACM SIGCOMM, Aug. 11, 2006, pp. 99-110.
Yap, et al., "Taking the Edge off with Espresso: Scale, Reliability and Programmability for Global Internet Peering", In Proceedings of ACM SIGCOMM, Aug. 7, 2017, pp. 432-445.
Zhang, et al., "Fast accurate computation of large-scale IP traffic matrices from link loads", In Proceedings of ACM Sigmetrics, Jun. 10, 2003, pp. 206-217.
International Preliminary Report on Patentability received for PCT Application No. PCT/US23/033319, mailed on May 1, 2025, 11 pages.

* cited by examiner

SYSTEMS AND METHODS FOR ROUTING DATA PACKET IN A UNIFIED WIDE AREA NETWORK

CROSS-REFERENCE TO RELATED APPLICATIONS

This application claims priority to and the benefit of U.S. Provisional Patent Application No. 63/417,756, filed on Oct. 20, 2022, which is hereby incorporated by reference in its entirety.

BACKGROUND

The large-scale commercialization of cloud computing has led cloud providers to provision private wide-area networks (WANs). These initial deployments connected both datacenters and Internet peering edges of the cloud using two wide-area networks (WANs)—a software-defined WAN (also called "SWAN") to carry inter-datacenter traffic and a standards-defined WAN (also called "CORE") for Internet traffic.

BRIEF SUMMARY

In some implementations, the techniques described herein relate to a method for routing data, including: obtaining an encapsulated data packet with a first label wherein the first label is an egress site label, wherein the encapsulated data packet has a destination; selecting an optimized traffic engineered tunnel from two or more tunnels; replacing the first label with the selected optimized traffic engineered tunnel label; and forwarding the data packet along the selected optimized traffic engineered tunnel.

In some implementations, the techniques described herein relate to a unified wide area network (WAN), including: a backbone router including a traffic engineering module, wherein the traffic engineering module sets a traffic engineered tunnel between the backbone router and a destination router for encapsulated data packets; and an aggregation router including a traffic steering module, wherein the traffic steering module encapsulates the encapsulated data packets and forwards an encapsulated data packet to the backbone router.

In some implementations, the techniques described herein relate to a method for routing a data packet by an ingress backbone router, including: receiving an encapsulated data packet having a first label and a second label, wherein the first label is an egress site label, and the second label is a node segment identifier (node SID); determining whether a traffic engineered tunnel to an egress site is available; when the traffic engineered tunnel to the egress site is available, replacing the first label with the traffic engineered tunnel and forwarding the encapsulated data packet along the traffic engineered tunnel; and when the traffic engineered tunnel to the egress site is not available, removing the first label and forwarding the encapsulated data packet using the node SID.

This summary is provided to introduce a selection of concepts that are further described below in the detailed description. This summary is not intended to identify key or essential features of the claimed subject matter, nor is it intended to be used as an aid in limiting the scope of the claimed subject matter.

Additional features and advantages of embodiments of the disclosure will be set forth in the description which follows, and in part will be obvious from the description, or may be learned by the practice of such embodiments. The features and advantages of such embodiments may be realized and obtained by means of the instruments and combinations particularly pointed out in the appended claims. These and other features will become more fully apparent from the following description and appended claims or may be learned by the practice of such embodiments as set forth hereinafter.

BRIEF DESCRIPTION OF THE DRAWINGS

In order to describe the manner in which the above-recited and other features of the disclosure can be obtained, a more particular description will be rendered by reference to specific implementations thereof which are illustrated in the appended drawings. For better understanding, the like elements have been designated by like reference numbers throughout the various accompanying figures. While some of the drawings may be schematic or exaggerated representations of concepts, at least some of the drawings may be drawn to scale. Understanding that the drawings depict some example implementations, the implementations will be described and explained with additional specificity and detail through the use of the accompanying drawings in which.

DETAILED DESCRIPTION

Operating two separate large-scale WANs (CORE and SWAN) may be complex and cost inefficient. For example, since routers are designated for either inter-datacenter traffic routing or for Internet traffic routing, load balancing between the two may not be possible. Furthermore, as the datacenter edges connect to both SWAN and CORE routers, this dual WAN connectivity may lead to wasteful use of expensive network equipment and limited power supply. Building new datacenter regions and edge sites have only made this problem worse.

The split-WAN architecture may make capacity planning hard. At a given time, one WAN may be under-utilized while the other WAN may be over-utilized. Moreover, acquiring optimal capacity from both WANs in every geographical region and building the required redundancy on each WAN, may became prohibitively expensive. At the same time, Internet traffic has steadily grown, and the Resource Reservation protocol—Traffic Engineering (RSVP-TE) protocol used in the CORE network is reaching scale limits due to the existing size of the CORE network topology. SWAN routers run Border Gateway Protocol (BGP) which is responsible for generating and updating routing table information and store it in the router memory.

Therefore, there is a need for unified wide area network (unified WAN) that is capable to carry both inter-datacenter traffic and internet traffic using software-defined control. Furthermore, there is a need for a new routing method for routing data in much larger scale than either of the two WANs are currently handling.

Figure 1:
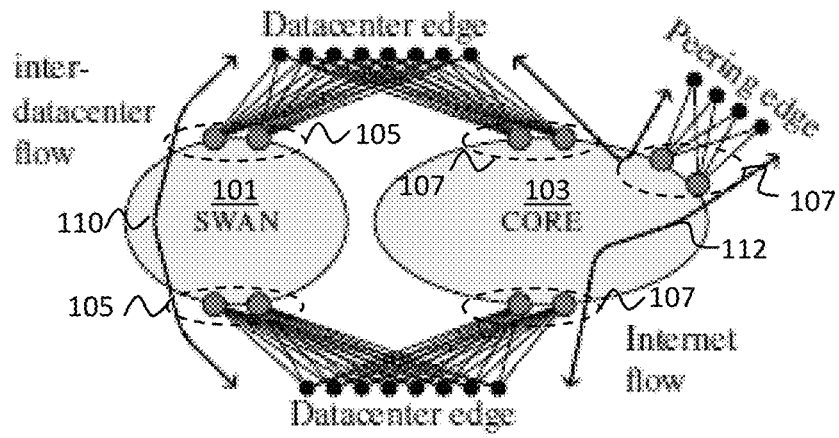
FIG. 1 is an example of two wide-area networks (WANs), a software-defined WAN (SWAN) that carries inter-datacenter traffic and a standards-defined WAN (CORE) that carries Internet traffic.

FIG. 1 provides an example of current environment with two wide-area networks (WANs), a software-defined WAN 101 (also called "SWAN") that carries inter-datacenter traffic 110 and a standards-defined WAN 103 (also called "CORE") that carries Internet traffic 112. SWAN 101 includes SWAN routers 105 and CORE includes CORE routers 107. The SWAN routers 105 and the CORE routers 107 use completely different protocol stacks. One possible disadvantage of operating two separate WANs is that it may make capacity planning hard. Another possible disadvantage is that currently the datacenter edges need to support both the SWAN and the CORE routers, leading to wasteful use of expensive network equipment and limited power supply.

By consolidating SWAN and CORE networks into a unified WAN, a new method to route data is needed. Traffic Engineering (RSVP-TE) protocol used in the CORE network is reaching scale limits due to the existing size of the CORE network topology and hence could not be utilized in unified WAN. SWAN routers run Border Gateway Protocol (BGP) which is responsible for generating and updating routing table information and store it in the router memory. A unified WAN router, if using BGP, would need to hold the entire Internet routing table which would be cost prohibitive as the routing table includes several millions of routes. One possible disadvantage of converting each router in the unified WAN to run BGP with the full routing tables would be the need to have high ternary content-addressable memories (TCAMs) for all the routers.

Figure 2:
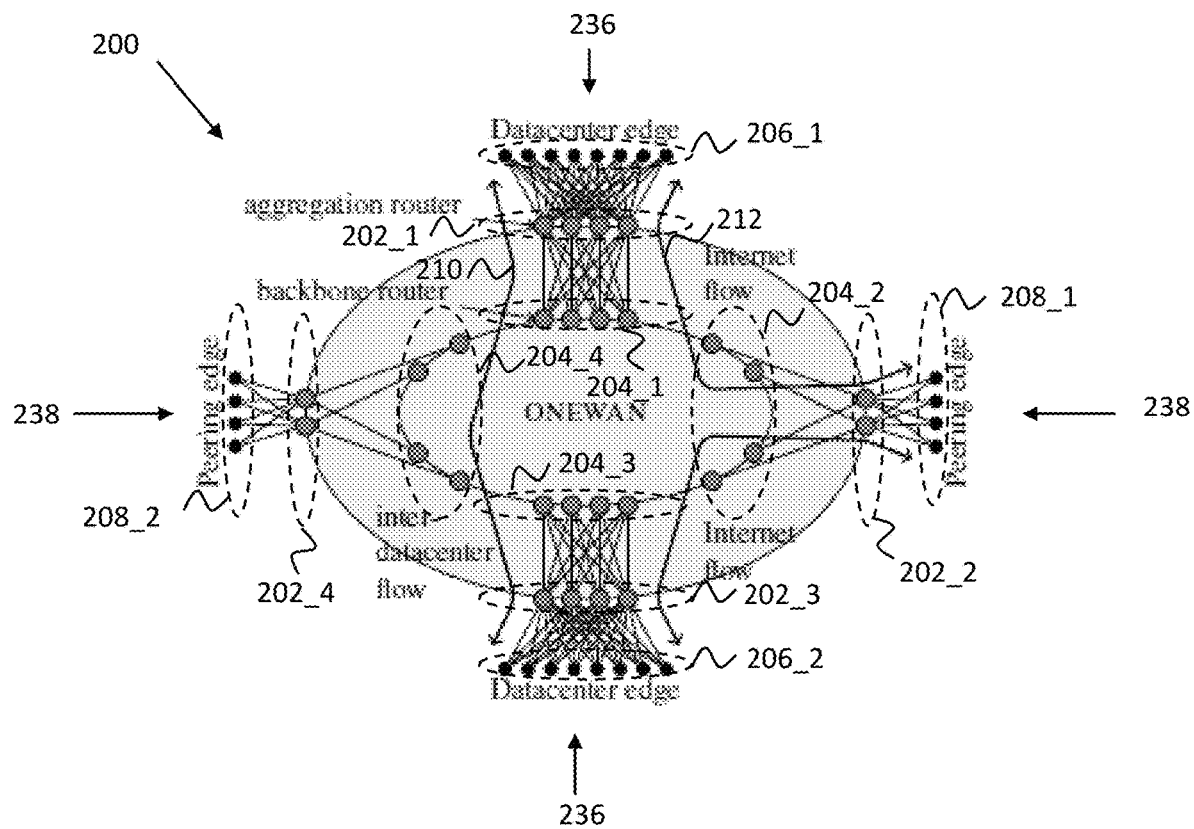
FIG. 2 is an example of simplified view of unified WAN with two datacenter regions and two edge sites, according to least one embodiment.

Therefore, the unified WAN assigns two roles to routers: (1) aggregation routers that hold full IP routing table and (2) backbone routers that operate as forwarding only nodes. FIG. 2, provides an example of simplified view of unified WAN 200 with two datacenter regions 236 and two edge sites 238, according to at least one embodiment. One possible benefit of having only the aggregation routers to hold full routing tables is that it allows the remaining backbone routers to be simpler, inexpensive forwarding only devices with smaller ternary content-addressable memories (TCAMs).

In some embodiments, an aggregation router in the unified WAN, such as the aggregation router 202_1 and 202_3 in FIG. 2, may connect to datacenter edge router, such as the datacenter edge router 206_1 and 206_2 respectively. A datacenter edge router is a specialized router located at the network boundary of a datacenter that allows interconnection and exchange of routing data with aggregation routers for the purpose of interconnecting with other datacenters and with the Internet.

In some embodiments, an aggregation router in the unified WAN, such as the aggregation router 202_2 and 202_4, may connect to peering edge 208_1 and 208_2 respectively. Peering edge allows interconnection and exchange of Internet routing data between autonomous systems, where an autonomous system is a network or group of networks administered by a single routing policy. Internet peering routers exchange routing data between networks administered by different entities.

The unified WAN 200 includes plurality of aggregation routers 202_1, 202_2, 202_3, and 202_4 and plurality of backbone routers 204_1, 204_2, 204_3, and 204_4. In some embodiments, the plurality of aggregation routers and the plurality of backbone routers are configured to route both inter-datacenter data packets and Internet data packets using a method as further discussed in connection to FIG. 4.

In some embodiments, the unified WAN 200 may route data packets between two datacenters. For example, a first datacenter edge router 206_1 may send data packets to a second datacenter edge router 206_2 via an ingress aggregation router 202_1, an ingress backbone router 204_1, an egress backbone router 204_3, and an egress aggregation router 202_3, using a method as further discussed in connection to FIG. 4, and as shown by an arrow 210. In some embodiments, the unified WAN 200 may route data packets between an outside network and a datacenter. For example, a peering edge router 208_1 may send data packets to datacenter edge router 206_1 via an ingress aggregation router 202_2, an ingress backbone router 204_2, an egress backbone router 204_1 and an egress aggregation router 202_1, using a method as further discussed in connection to FIG. 4 and as shown by an arrow 212. The roles of the aggregation router and the backbone routers are further discussed in connection to FIG. 6.

Figure 3:
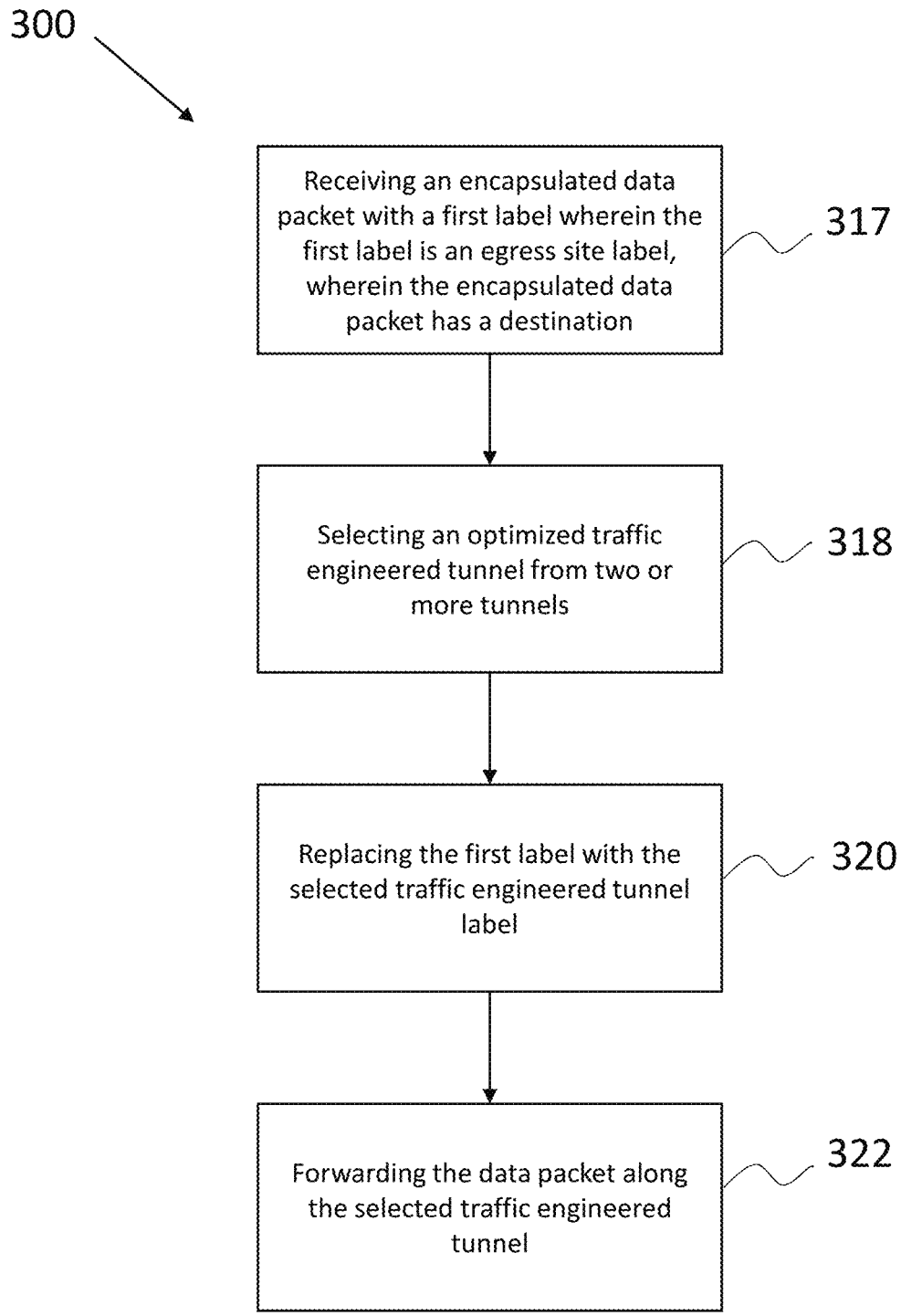
FIG. 3 represents a method for routing data, according to at least one embodiment.

FIG. 3 represents a method 300 for routing data, according to at least one embodiment. The method 300 includes receiving (e.g., obtaining) an encapsulated data packet with a first label wherein the first label is an egress site label, wherein the encapsulated data packet has a destination, at stage 317. In some embodiments, the method 300 further includes a method for routing data in a unified WAN. In some embodiments, a unified WAN consists of plurality of sites wherein each unified WAN site is assigned a static identifier called a site label. For example, the site label may be a unique alphanumeric site label. One possible benefit of having a unique static identifier is to ease the method of routing as further explained below.

In some embodiments, each unified WAN site includes plurality of aggregation routers and plurality of backbone routers. In some embodiments, the plurality of aggregation routers and the plurality of backbone routers are configured to route both inter-datacenter data packets and Internet data packets.

In some embodiments, the encapsulated data packet is received by an ingress backbone router. In some embodiments, the encapsulated data packet is sent by an ingress aggregation router. In some embodiments, the ingress aggregation router encapsulates the encapsulated data packet including adding a first label to the data packet. In some embodiments, the encapsulation is done by Multiprotocol Label Switching (MPLS). Other embodiments may encapsulate the data packets in Internet Protocol Version 6 that provides equivalent functions for what is outlined below. MPLS is a routing technique that directs data packets from one node to the next based on a label stack rather than network address. One possible advantage of MPLS is that it allows packet-forwarding decisions to be made solely on the content of the label, without the need to examine the packet itself, as further discussed below. In some embodiments, MPLS can encapsulate packets of network protocols. For example, MPLS may add additional labels to a packet header.

In some embodiments, the ingress aggregation router holds full IP routing tables. For example, full routing tables include both Internet and datacenter routing tables. In some embodiments, the aggregation router includes a Border Gateway Protocol (BGP). BGP is the protocol underlying the global routing system of the Internet. It manages how packets get routed from network to network through the exchange of routing and reachability information among edge routers.

In some embodiments, the BGP is responsible for generating and updating the full routing table information on the aggregation router. In some embodiments, the BGP on the aggregation router receives routes announced by at least one of a BGP route reflector, or a BGP client. In some embodiments, the BGP chooses one or more equal-cost BGP next hops for each prefix in a routing table based on the received routes. For example, the prefix is an alphanumeric value of a destination address. In some embodiments, the one or more BGP next hops are one or more aggregation routers at unified WAN network egress sites. In some embodiments, the one or more BGP next hops are endpoints beyond the unified WAN network egress site in legacy portions of WANs. For example, if some WANs have been converted to unified WAN's but some are still working as either SWAN or as CORE WANs, then the destination of the data packet is in a legacy portion of WAN (e.g., SWAN or CORE).

In some embodiments, the egress site label refers to a backbone exiting site on a shortest path to the data packet's destination. For example, in FIG. 2, if a data packet received by an ingress aggregation router 202_1 has a destination at a second datacenter edge 206_2, the backbone exiting site is a site where an egress backbone router 204_3 resides, as the egress backbone router 204_3 has the shortest path to the data packet's destination (206_2).

One possible benefit of encapsulating a data packet with an egress site label is that the ingress backbone router may perform traffic engineering without IP routing.

In some embodiments, the encapsulated data packet further includes a second label. For example, the second label may be added by the MPLS. In some embodiments, the second label is a node segment identifier (node SID). In some embodiments, the node SID is the BGP next-hop. The BGP next-hop is from the routing table generated by the BGP.

In some embodiments, the ingress backbone router resides in (e.g., is located at) the same site as the ingress aggregation router (e.g., on the same WAN site). In some embodiments, the ingress backbone router does not hold full IP routing tables. One possible benefit of having only the aggregation routers to run BGP with the full routing tables is that it allows the remaining backbone routers to be simpler, inexpensive forwarding only devices with smaller ternary content-addressable memories (TCAMs).

In some embodiments, ingress aggregation routers are directly connected with equal capacity to ingress backbone routers, but each ingress backbone router may not be an equal choice for the ingress aggregation router. For example, one ingress backbone router may have a longer path to the destination of the data packet which may increase latency. In another example, an ingress backbone router may have less available bandwidth to an egress site which may cause congestion.

In some embodiments, the ingress backbone router where the ingress aggregation router forwards the encapsulated data packet is selected based on a weighted traffic steering route calculation. In some embodiments, the weighted traffic steering route calculations are done by a unified WAN agent that runs as a process on the ingress aggregation router. In some embodiments, the unified WAN agent communicates with a controller using a HTTPS server. In some embodiments, the controller computes weighted traffic steering route calculations for the unified WAN agent. In some embodiments, the unified WAN agent programs traffic steering routes on the ingress aggregation router based on the weighted traffic steering calculations of the controller. For example, the controller may exclude ingress backbone routers with shortest path latency from the ingress aggregation router to the egress site exceeding the best latency by a threshold, and then the controller may calculate weights using single commodity maximum flow from the ingress aggregation router to the egress site.

The method 300 further includes selecting an optimized traffic engineered tunnel from two or more tunnels at stage 318. In some embodiments, the backbone router performs a traffic engineered optimization. In some embodiments, the traffic engineered optimization includes measuring a traffic matrix (TM) and a network graph. The Unified WAN TM is a collection of traffic trunks and bandwidths for each trunk. A traffic trunk is an aggregate traffic flow from a source backbone router (e.g., the ingress backbone router) to a destination site for a specific traffic class. In some embodiments, there may be four primary traffic classes in unified WAN: voice, interactive, best-effort, and scavenger. A network graph is a dynamic topology consisting of sites, nodes, links, other features, or combinations thereof. For example, each node and link may have different attributes, including interface addresses, device role, link operational bandwidth, bandwidth reserved for RSVP-TE, link metric, whether link or node should be avoided due to maintenance activity, link reliability information, other attributes, or combinations thereof.

In some embodiments, the traffic engineered optimization has two phases: a path computation phase and an optimization phase. In the path computation phase, online computation of paths on the dynamic topology for all traffic trunks may be performed. In the optimization phase, a priority fairness optimization solver may allocate traffic trunks to paths. The TM may be divided based on the traffic class of trunks and/or each traffic class may be optimized differently. In some embodiments, the priority fairness solver chains four solvers (max-min fairness, minimize cost, minimize maximum utilization, and diverse path) in different combinations based on traffic classes.

In some embodiments, the ingress backbone router further includes a unified WAN agent. In some embodiments, the unified WAN agent programs two or more traffic engineered routes on the ingress backbone router based on the traffic engineered optimization.

In some embodiments, selecting an optimized traffic engineered tunnel from two or more tunnels further includes the ingress backbone router using the egress site label to determine one or more traffic engineered tunnels to use between ingress backbone router and an egress backbone router wherein the egress backbone router is located at the egress site.

The method 300 includes replacing the first label with the selected traffic engineered tunnel label at stage 320. In some embodiments there may be no operationally up tunnels available, and hence no traffic engineered tunnel may be used, as further discussed in connection to FIG. 5.

The method 300 includes forwarding the data packet along selected traffic engineered tunnel at stage 322. In some embodiments, the data packet is forwarded by the ingress backbone router to an egress backbone router along the selected traffic engineered tunnel. In some embodiments, the traffic engineered tunnels terminate at the egress backbone router. One possible benefit of terminating the traffic engineered tunnel at an egress backbone router rather than an egress aggregation router is that the node SID label must be removed before the data packet is delivered to the intended destination. Routers do not easily support popping (e.g., removing) a label stack, hence at least one segment routed hop is needed (e.g., from the egress backbone router to the egress aggregation router) to remove the node SID label. In some embodiments, segment routing implementations on vendor routers only allow penultimate hop popping (PHP), meaning that the penultimate router (e.g., the egress backbone router) must remove the node SID label and then forward the data packet to the final router (e.g., egress aggregation router). In some embodiments, the egress backbone router performs segment routing using the second label (node SID) and removes the node SID label. For example, the egress backbone router uses the node SID label to segment route the data packet to a final destination on an egress aggregation router.

In some embodiments, the traffic engineered tunnels terminate at the egress aggregation router. Termination at the final router would require a support for ultimate hop popping. In ultimate hop popping the node SID label may be removed at the final router (e.g., the egress aggregation router). In some embodiments, the egress aggregation router removes the second label from the encapsulated data packets.

Figure 4:
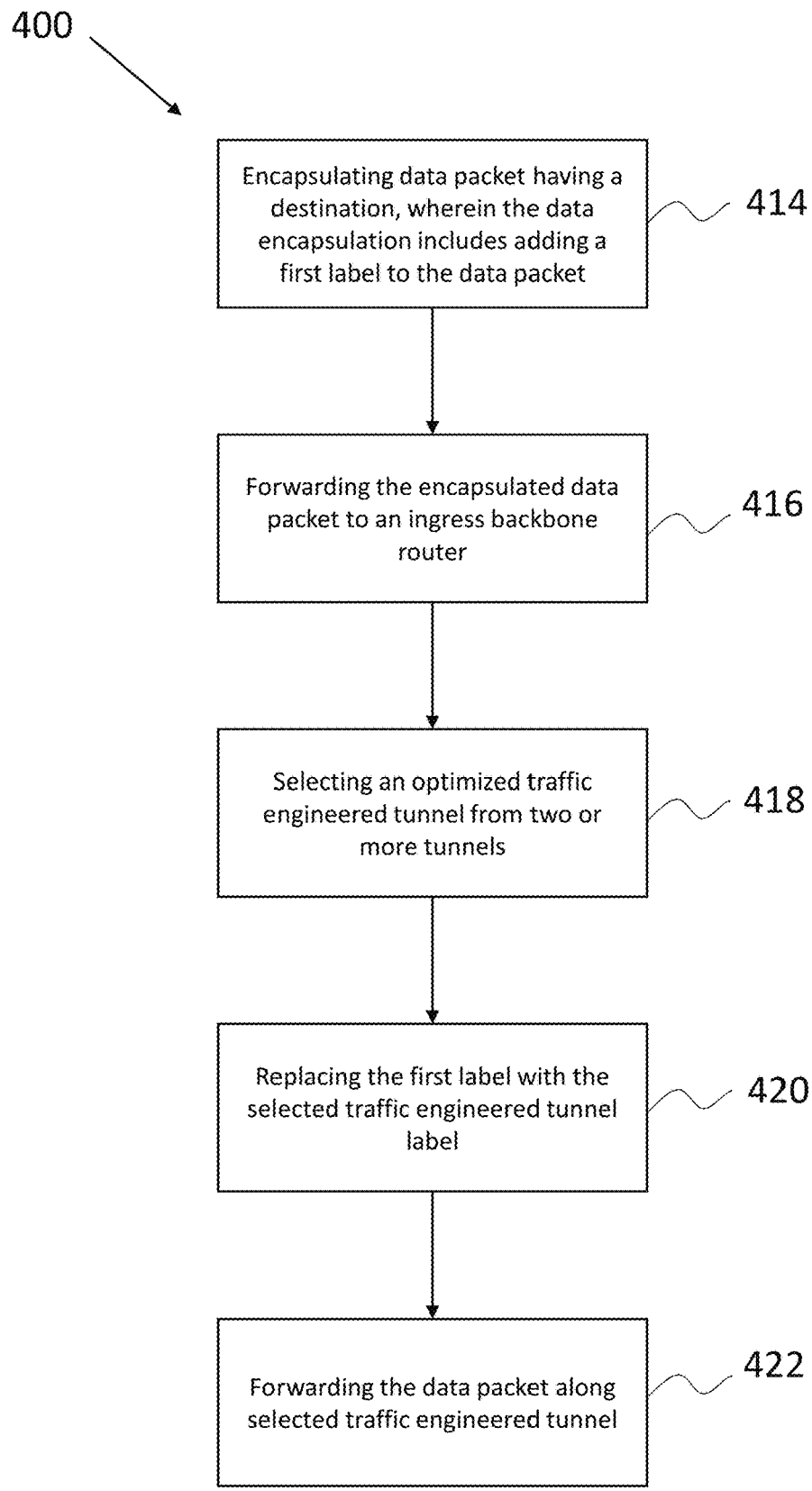
FIG. 4 represents a method for routing data, according to at least one embodiment.

FIG. 4 represents a method 400 for routing data, according to at least one embodiment. In some embodiments, the method 400 further includes a method for routing data in a unified WAN. In some embodiments, a unified WAN consists of plurality of sites wherein each unified WAN site is assigned a static identifier called a site label. For example, the site label may be a unique alphanumeric site label. One possible benefit of having a unique static identifier is to ease the method of routing as further explained below.

In some embodiments, each unified WAN site includes plurality of aggregation routers and plurality of backbone routers. In some embodiments, the plurality of aggregation routers and the plurality of backbone routers are configured to route both inter-datacenter data packets and Internet data packets.

The method 400 includes encapsulating (e.g., by an ingress aggregation router) a data packet having a destination. The data encapsulation includes adding a first label to the data packet at stage 414. In some embodiments, the encapsulation is done by Multiprotocol Label Switching (MPLS). Other embodiments may encapsulate the data packets in Internet Protocol Version 6 that provides equivalent functions for what is outlined below. MPLS is a routing technique that directs data packets from one node to the next based on labels rather than network address. One possible advantage of MPLS is that it allows packet-forwarding decisions to be made solely on the content of the label, without the need to examine the packet itself, as further discussed below. In some embodiments, MPLS can encapsulate packets of network protocols. For example, MPLS may add additional labels to a packet header.

In some embodiments, the ingress aggregation router holds full IP routing tables. For example, full routing tables include both Internet and datacenter routing tables. In some embodiments, the aggregation router includes a Border Gateway Protocol (BGP). BGP is the protocol underlying the global routing system of the Internet. It manages how packets get routed from network to network through the exchange of routing and reachability information among edge routers.

In some embodiments, the BGP is responsible for generating and updating the full routing table information on the aggregation router. In some embodiments, the BGP on the aggregation router receives routes announced by at least one of a BGP route reflector, or a BGP client. In some embodiments, the BGP chooses one or more equal-cost BGP next hops for each prefix in a routing table based on the received routes. For example, the prefix is an alphanumeric value of a destination address. In some embodiments, the one or more BGP next hops are one or more aggregation routers at unified WAN network egress sites. In some embodiments, the one or more BGP next hops are endpoints beyond the unified WAN network egress site in legacy portions of WANs. For example, if some WANs have been converted to unified WAN's but some are still working as either SWAN or as CORE WANs, then the destination of the data packet is in a legacy portion of WAN (e.g., SWAN or CORE).

In some embodiments, the first label is an egress site label. For example, the egress site label may refer to a backbone exiting site on a shortest path to the data packet's destination. For example, in FIG. 2, if a data packet received by an ingress aggregation router 202_1 has a destination at a second datacenter edge 206_2, the backbone exiting site is a site where an egress backbone router 204_3 resides, as the egress backbone router 204_3 has the shortest path to the data packet's destination (206_2).

One possible benefit of encapsulating a data packet with an egress site label is that the ingress backbone router may perform traffic engineering without IP routing.

In some embodiments, encapsulating the data packet further includes adding a second label to the data packet. For example, the second label may be added by the MPLS. In some embodiments, the second label is a node segment identifier (node SID). In some embodiments, the node SID is the BGP next-hop. The BGP next-hop is from the routing table generated by the BGP.

The method 400 further includes forwarding the encapsulated data packet to an ingress backbone router at stage 416. In some embodiments, the ingress backbone router resides in (e.g., is located at) the same site as the ingress aggregation router. In some embodiments, the ingress backbone router does not hold full IP routing tables. One possible benefit of having only the aggregation routers to run BGP with the full routing tables is that it allows the remaining backbone routers to be simpler, inexpensive forwarding only devices with smaller ternary content-addressable memories (TCAMs).

In some embodiments, ingress aggregation routers are directly connected with equal capacity to ingress backbone routers, but each ingress backbone router may not be an equal choice for the ingress aggregation router. For example, one ingress backbone router may have a longer path to the destination of the data packet which may increase latency. In another example, an ingress backbone router may have less available bandwidth to an egress site which may cause congestion.

In some embodiments, the ingress backbone router where the ingress aggregation router forwards the encapsulated data packet is selected based on a weighted traffic steering route calculation. In some embodiments, the weighted traffic steering route calculations are done by a unified WAN agent that runs as a process on the ingress aggregation router. In some embodiments, the unified WAN agent communicates with a controller using a HTTPS server. In some embodiments, the controller computes weighted traffic steering route calculations for the unified WAN agent. In some embodiments, the unified WAN agent programs traffic steering routes on the ingress aggregation router based on the weighted traffic steering calculations of the controller. For example, the controller may exclude ingress backbone routers with shortest path latency from the ingress aggregation router to the egress site exceeding the best latency by a threshold, and then the controller may calculate weights using single commodity maximum flow from the ingress aggregation router to the egress site.

The method 400 further includes selecting an optimized traffic engineered tunnel from two or more tunnels at stage 418. In some embodiments, the backbone router performs a traffic engineered optimization. In some embodiments, the traffic engineered optimization includes measuring a traffic matrix (TM) and a network graph. The Unified WAN TM is a collection of traffic trunks and bandwidths for each trunk. A traffic trunk is an aggregate traffic flow from a source backbone router (e.g., the ingress backbone router) to a destination site for a specific traffic class. In some embodiments, there may be four primary traffic classes in unified WAN: voice, interactive, best-effort, and scavenger. A network graph is a dynamic topology consisting of sites, nodes, links, other features, or combinations thereof. For example, each node and link may have different attributes, including interface addresses, device role, link operational bandwidth, bandwidth reserved for RSVP-TE, link metric, whether link or node should be avoided due to maintenance activity, link reliability information, other attributes, or combinations thereof.

In some embodiments, the traffic engineered optimization has two phases: a path computation phase and an optimization phase. In the path computation phase, online computation of paths on the dynamic topology for all traffic trunks may be performed. In the optimization phase, a priority fairness optimization solver may allocate traffic trunks to paths. The TM may be divided based on the traffic class of trunks and/or each traffic class may be optimized differently. In some embodiments, the priority fairness solver chains four solvers (max-min fairness, minimize cost, minimize maximum utilization, and diverse path) in different combinations based on traffic classes.

In some embodiments, the ingress backbone router further includes a unified WAN agent. In some embodiments, the unified WAN agent programs two or more traffic engineered routes on the ingress backbone router based on the traffic engineered optimization.

In some embodiments, selecting an optimized traffic engineered tunnel from two or more tunnels further includes the ingress backbone router using the egress site label to determine one or more traffic engineered tunnels to use between ingress backbone router and an egress backbone router wherein the egress backbone router is located at the egress site.

The method 400 includes replacing the first label with the selected traffic engineered tunnel label at stage 420. In some embodiments there may be no operationally up tunnels available, and hence no traffic engineered tunnel may be used, as further discussed in connection to FIG. 5.

The method 400 includes forwarding the data packet along selected traffic engineered tunnel at stage 422. In some embodiments, the data packet is forwarded by the ingress backbone router to an egress backbone router along the selected traffic engineered tunnel. In some embodiments, the traffic engineered tunnels terminate at the egress backbone router. One possible benefit of terminating the traffic engineered tunnel at an egress backbone router rather than an egress aggregation router is that the node SID label must be removed before the data packet is delivered to the intended destination. Routers do not easily support popping (e.g., removing) a label stack, hence at least one segment routed hop is needed (e.g., from the egress backbone router to the egress aggregation router) to remove the node SID label. In some embodiments, segment routing implementations on vendor routers only allow penultimate hop popping (PHP), meaning that the penultimate router (e.g., the egress backbone router) must remove the node SID label and then forward the data packet to the final router (e.g., egress aggregation router). In some embodiments, the egress backbone router performs segment routing using the second label (node SID) and removes the node SID label. For example, the egress backbone router uses the node SID label to segment route the data packet to a final destination on an egress aggregation router.

In some embodiments, the traffic engineered tunnels terminate at the egress aggregation router. Termination at the final router would require a support for ultimate hop popping. In ultimate hop popping the node SID label may be removed at the final router (e.g., the egress aggregation router). In some embodiments, the egress aggregation router removes the second label from the encapsulated data packets.

Figure 5:
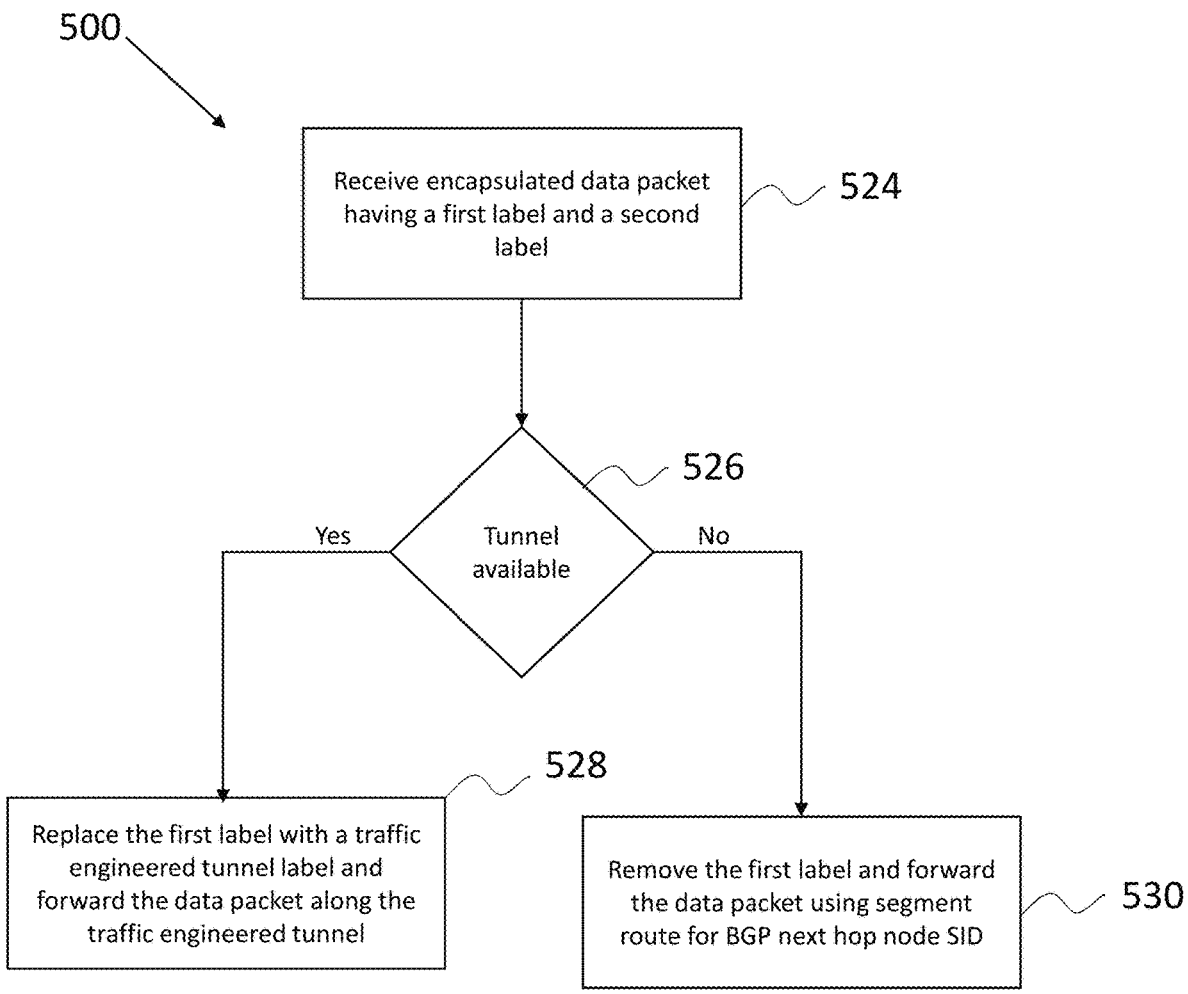
FIG. 5 represents a method for routing data packet by an ingress backbone router, according to at least one embodiment.

FIG. 5 represents a method 500 for routing data by an ingress backbone router in case there are no tunnels available, according to at least one embodiment. The method 500 includes receiving (e.g., obtaining) an encapsulated data packet having a first label and a second label, wherein the first label is an egress site label and the second label is a node segment identifier (node SID) label, at stage 524. In some embodiments, the ingress backbone router receives the encapsulated data packet from an ingress aggregation router. For example, the ingress aggregation router may have encapsulated the data packet as previously discussed in connection to FIG. 4. In some embodiments, the ingress aggregation router has encapsulated the data packet with Multiprotocol Label Switching (MPLS)

The method 500 further includes determining whether a traffic engineered tunnel to an egress site is available, at stage 526. When the traffic engineered tunnel to the egress site is available, the ingress backbone router replaces the first label with the traffic engineered tunnel label and forwards the data packet along the traffic engineered tunnel, at stage 528. When the traffic engineered tunnel to the egress site is not available, the ingress backbone router removes the first label and forwards the data packet using the node SID, at stage 530. In some embodiments, the node SID is a BGP next-hop from the routing table stored in the ingress aggregation router.

In some embodiments, the second label (e.g., node SID) is used as a fallback if no traffic engineered tunnel for the egress site is up due to e.g., a failure. For example, when an ingress backbone router has no operationally up traffic engineered tunnels to a particular egress site, the unified WAN agent on the ingress backbone router removes the first label (e.g., the egress site label) and forwards the data packet using the segment route for the BGP next hop node SID. One possible advantage of this is that failures in the network are quickly and transparently handled by the routers without immediate intervention of a controller.

In some embodiments, when an ingress backbone router has operationally up traffic engineered tunnels to a particular egress site, the unified WAN agent on the ingress backbone router replaces the first label (e.g., the egress site label) with the traffic engineered tunnel label and forwards the data packet along the traffic engineered tunnel.

Figure 6:
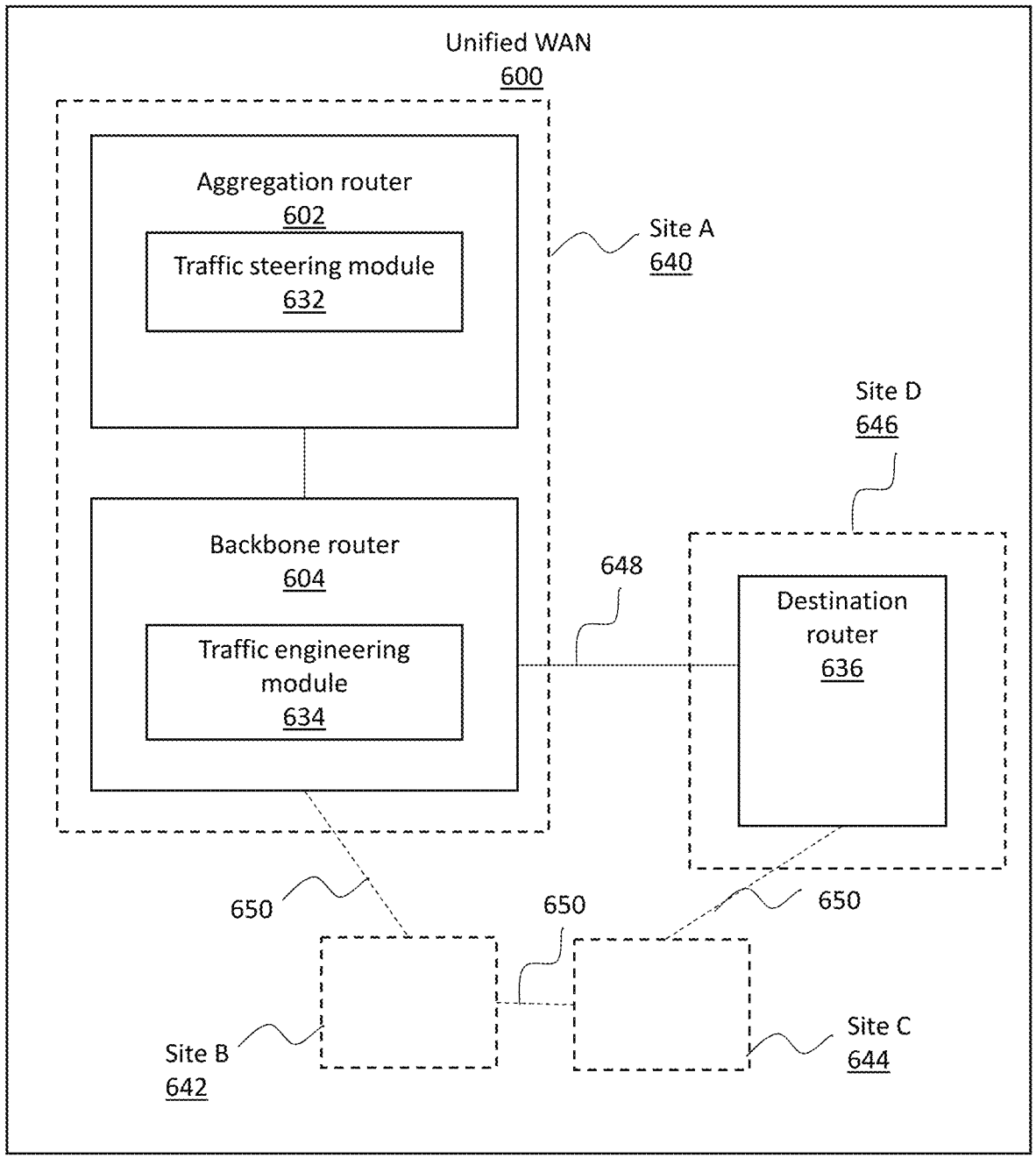
FIG. 6 represents a unified WAN including an aggregation router and backbone router, according to at least one embodiment.

FIG. 6 represents a unified WAN 600 including an aggregation router 602 and backbone router 604, according to at least one embodiment. The aggregation router 602 includes a traffic steering module 632, wherein the traffic steering module 632 encapsulates data packets and forwards the encapsulated data packets to a backbone router 604. The backbone router 604 includes a traffic engineering module 634, wherein the traffic engineering module 634 sets traffic engineered tunnel between the backbone router 604 and a destination router 636 for the data packets.

In some embodiments, the unified WAN 600 consists of plurality of sites wherein each unified WAN site is assigned a static identifier called a site label. FIG. 6 includes four different sites: Site A 640, Site B 642, Site C 644, and Site D 646, but it should be understood that in some embodiments there could be more than four or less than four sites. One possible benefit of having a unique static identifier is to ease the method of routing as further explained below. The aggregation router 602 and the backbone router 604 reside on the same site, Site A 640, as shown by FIG. 6.

In some embodiments, the aggregation router 602 runs a Border Gateway Protocol (BGP). In some embodiments, the BGP generates a full IP routing tables on the aggregation router. For example, the full IP routing table include both Internet and datacenter routing tables. In some embodiments, the BGP on aggregation router may receive routes announced by at least one of a BGP route reflector, or a BGP client. In some embodiments, the BGP chooses one or more equal-cost BGP next hops for each prefix in a routing table based on received routes. In some embodiments, the one or more equal-cost BGP next hops are an egress aggregation router. In some embodiments, the one or more equal-cost BGP next hops are beyond an egress aggregation router.

In some embodiments, each unified WAN site includes plurality of aggregation routers and plurality of backbone routers. In some embodiments, the plurality of aggregation routers and the plurality of backbone routers are configured to route both inter-datacenter data packets and Internet data packets.

FIG. 6 shows only one backbone router 604 and only one aggregation router 602 on Site A 640, but it should be noted that there may be more than one backbone router and more than one aggregation router on Site A. The backbone router 604 where the data packet is forwarded to is selected based on weighted traffic steering route calculations by the traffic steering module 632. In some embodiments, the weighted traffic steering route calculations are done by unified WAN agent that runs as a process on the aggregation router 602. In some embodiments, the unified WAN agent communicates with a controller using a HTTPS server. In some embodiments, the controller computes weighted traffic steering route calculations for the unified WAN agent. In some embodiments, the unified WAN agent programs traffic steering routes on the aggregation router 602 based on the weighted traffic steering route calculations of the controller. In some embodiments, the controller excludes backbone routers with shortest path latency from the aggregation router to the destination site exceeding the best latency by a threshold, and then calculates weights using single commodity maximum flow from the aggregation router to the destination site.

In some embodiments, the traffic steering module 632 encapsulating a data packet having a destination further includes adding a first label to the data packet. In some embodiments, the encapsulation is done by Multiprotocol Label Switching (MPLS). In some embodiments, the first label is an egress site label. In some embodiments, the egress site label refers to backbone exiting site on the shortest path to the data packet's destination. For example, in FIG. 6, the egress site label is Site D 646, as the destination router 636 of the data packet is there.

In some embodiments, the traffic steering module 632 encapsulating a data packet having a destination further includes adding a second label to the data packet. In some embodiments, the second label is a node segment identifier (node SID). In some embodiments, the node SID is the BGP next-hop as discussed above.

In some embodiments, the backbone router 604, act as forwarding only node that does not run BGP nor hold full IP routing table. One possible benefit of holding full IP routing tables only at the aggregation routers is that the size of the routing table may be smaller and therefore more manageable at the backbone router 604.

In some embodiments, the traffic engineering module 634 selects an optimized traffic engineered tunnel from two or more tunnels by performing traffic engineering optimization. In some embodiments, the traffic engineering optimization includes measuring traffic matrix (TM) and network graph. In some embodiments the TM is a collection of traffic trunks and bandwidths for each trunk. A traffic trunk is an aggregate traffic flow from a source backbone router to a destination site for a specific traffic class. In some embodiments, there may be four primary traffic classes in unified WAN: voice, interactive, best-effort, and scavenger. A network graph is a dynamic topology consisting of sites, nodes and links. For example, each node and link may have tens of different attributes, including interface addresses, device role, link operational bandwidth, bandwidth reserved for RSVP-TE, link metric, whether link or node should be avoided due to maintenance activity, and link reliability information.

In some embodiments, the traffic engineered optimization has two phases: a path computation phase and an optimization phase. In path computation phase online computation of paths on the dynamic topology for all traffic trunks is performed. In optimization phase, a priority fairness optimization solver allocates traffic trunks to paths. The TM is divided based on the traffic class of trunks and each traffic class is optimized differently. In some embodiments, the priority fairness optimization solver chains two or more solvers (max-min fairness, minimize cost, minimize maximum utilization, and diverse path) in different combinations based on traffic classes.

In some embodiments, the backbone router 604 further includes a unified WAN agent. In some embodiments, the unified WAN agent programs two or more traffic engineered routes on the backbone router based on the traffic engineered optimization module.

In some embodiments, selecting an optimized traffic engineered tunnel from two or more tunnels further includes the backbone router 604 using the egress site label (e.g., site D 646) to determine one or more traffic engineered tunnels to use between the backbone router 604 and the destination router 636 wherein the destination router 636 is located at the egress site 646. For example, in FIG. 6, the two traffic engineered tunnels are a straight tunnel 648 from Backbone router 604 at Site A 640 to the Destination router 636 at Site D 646, and a second tunnel 650 that goes through Site B 642 and Site C 644.

In some embodiments, the backbone router 604 replaces the first label with the selected traffic engineered tunnel label. In some embodiments there may be no tunnels alive, and hence no traffic engineered tunnel may be used, as previously discussed in connection to FIG. 5.

In some embodiments, the backbone router 604 forwards the data packet to the destination router along the selected traffic engineered tunnel. In some embodiments, the traffic engineered tunnels terminate at an egress backbone router. For example, in FIG. 6 the destination router 636 may be an egress backbone router. One possible benefit of terminating the traffic engineered tunnel at an egress backbone router rather than an egress aggregation router is that the node SID label must be removed before the data packet is delivered to the intended destination. Routers do not easily support popping a label stack, hence at least one segment routed hop is needed (e.g., from the egress backbone router to the egress aggregation router) to remove the node SID label. In some embodiments, segment routing implementations on vendor routers only allow penultimate hop popping (PHP), meaning that the penultimate router (e.g., the egress backbone router) must remove the node SID and then forward the data packet to the final router (e.g., egress aggregation router). In some embodiments, the egress backbone router performs segment routing using the second label (node SID) and removes the node SID label. For example, the egress backbone router uses the node SID to segment route the data packet to a final destination on egress aggregation router.

In some embodiments, the traffic engineered tunnel terminate at the egress aggregation router. For example, in FIG. 6 the destination router 636 may be an egress aggregation router. Termination at the final router would require a support for ultimate hop popping. In ultimate hop popping the node SID label may be removed at the final router (e.g., the egress aggregation router). In some embodiments, the egress aggregation router removes the second label from the encapsulated data packets.

Following are sections in accordance with embodiments of the present disclosure:

A1. A method for routing data, comprising:
  encapsulating, by an ingress aggregation router, a data packet having a destination, wherein the encapsulation includes adding a first label to the data packet;
  forwarding the encapsulated data packet to an ingress backbone router;
  selecting an optimized traffic engineered tunnel from two or more tunnels;
  replacing the first label with the selected optimized traffic engineered tunnel label; and
  forwarding the data packet along the selected optimized traffic engineered tunnel.
A2. The method of section A1, wherein the encapsulation is done by Multiprotocol Label Switching (MPLS).
A3. The method of any of the sections A1-A2, wherein the first label is an egress site label.
A4. The method of section A3, wherein the egress site label refers to backbone exiting site on a shortest path to the data packet's destination.
A5. The method of any of the sections A1-A4, wherein encapsulating the data packet further includes adding a second label to the data packet.
A6. The method of section A5, wherein the data packet is forwarded to an egress backbone router.
A7. The method of section A5, wherein the second label is a node segment identifier (node SID).
A8. The method of section A7, wherein the node SID is a BGP next hop.
A9. The method of any of the sections A1-A8, wherein the method further includes routing data in a unified wide area network (WAN).
A10. The method of section A9, wherein the unified WAN consists of plurality of sites.
A11. The method of section A10, wherein each unified WAN site is assigned a site label.
A12. The method of section A10, wherein each of the plurality of sites includes plurality of aggregation routers and plurality of backbone routers.
A13. The method of section A12, wherein the plurality of aggregation routers and the plurality of backbone routers are configured to route both inter-datacenter data packets and Internet data packets.
A14. The method of any of the sections A1-A13, wherein the ingress aggregation router holds full IP routing tables.
A15. The method of section A14, wherein the full IP routing tables includes both Internet and datacenter routing tables.
A16. The method of any of sections A14 and A15, wherein the full IP routing tables is generated by Border Gateway Protocol (BGP).
A17. The method of section A16, wherein the BGP on the ingress aggregation router receives routes announced by at least one of a BGP route reflector, or a BGP client.
A18. The method of section A17, wherein the BGP chooses one or more equal-cost BGP next hops for each prefix in a routing table based on received routes.
A19. The method of section A18, wherein the one or more equal-cost BGP next hops are an egress aggregation router.
A20. The method of section A18, wherein the one or more equal-cost BGP next hops are endpoint beyond an egress site in legacy portions of WANs.
A21. The method of section A10, wherein the ingress aggregation router and the ingress backbone router reside on same WAN site.
A22. The method of any of the sections A3-A21, wherein the ingress backbone router to which the encapsulated data packet is forwarded to is selected based on weighted traffic steering route calculations by the ingress aggregation router.
A23. The method of section A22, wherein the weighted traffic steering route calculations are done by unified WAN agent that runs as a process on the ingress aggregation router.
A24. The method of section A23, wherein the unified WAN agent communicates with a controller using a HTTPS server.
A25. The method of section A24, wherein the controller computes the weighted traffic steering route calculations for the unified WAN agent.
A26. The method of section A25, wherein the unified WAN agent programs the weighted traffic steering routes on the ingress aggregation router based on the weighted traffic steering route calculations of the controller.
A27. The method of section A26, wherein the controller excludes ingress backbone routers with shortest path latency from the ingress aggregation router to an egress site exceeding a best latency by a threshold, and then calculates weights using single commodity maximum flow from the ingress aggregation router to the egress site.
A28. The method of any of the sections A1-A27, wherein the ingress backbone router does not hold full IP routing tables.
A29. The method of any of the sections A3-A28, wherein selecting the optimized traffic engineered tunnel from the two or more tunnels further includes the ingress backbone router performing a traffic engineering optimization.
A30. The method of section A29, wherein the traffic engineering optimization includes measuring traffic matrix (TM) and network graph.
A31. The method of section A30, wherein the traffic matrix is a collection of traffic trunks and bandwidths for each trunk.
A32. The method of section A31, wherein a traffic trunk is an aggregate traffic flow from the ingress backbone router to a destination site for a traffic class.

A33. The method of section A32, wherein the traffic class is one of a voice, an interactive, a best-effort, and a scavenger.

A34. The method of section A30, wherein the network graph is a dynamic topology consisting of sites, nodes and links.

A35. The method of section A34, wherein the nodes and the links have one or more attributes.

A36. The method of section A35, wherein the one or more attributes is one of a interface address, a device role, a link operational bandwidth, a bandwidth reserved for RSVP-TE, a link metric, an information about whether or not a link or a node should be avoided, and a link reliability information.

A37. The method of any of the sections A29-A36, wherein the traffic engineering optimization includes a path computation phase and an optimization phase.

A38. The method of section A37, wherein in path computation phase online computation of paths on a dynamic topology for all traffic trunks is performed.

A39. The method of section A38, wherein in the optimization phase a priority fairness optimization solver allocates the traffic trunks to the paths.

A40. The method of section A38, wherein each traffic trunk is optimized differently.

A41. The method of section A39, wherein the priority fairness optimization solver further includes chaining four solvers in different combinations based on traffic classes.

A42. The method of section A41, wherein the four solvers include a max-min fairness solver, a minimize cost solver, a minimize maximum utilization solver, and a diverse path solver.

A43. The method of any of the sections A29-A42, wherein the ingress backbone router further includes a unified WAN agent.

A44. The method of section A43, wherein the unified WAN agent further includes programming two or more traffic engineered tunnels on the ingress backbone router based on the traffic engineering optimization.

A45. The method of any of the sections A3-A44, wherein selecting the optimized traffic engineered tunnel from the two or more tunnels further includes the ingress backbone router using the egress site label to determine one or more tunnels between the ingress backbone router and an egress backbone router wherein the egress backbone router is located at an egress site.

A46. The method of section A45, wherein forwarding the data packet along the selected traffic engineered tunnel further includes the ingress backbone router forwarding the data packet to the egress backbone router using the selected traffic engineered tunnel.

A47. The method of section A46, wherein the traffic engineered tunnel terminates at the egress backbone router.

A48. The method of section A47, wherein the egress backbone router performs segment routing using a second label.

A49. The method of section A48, wherein the egress backbone router removes the second label from the encapsulated data packets.

A50. The method of section A46, wherein the traffic engineered tunnel terminates at an egress aggregation router.

A51. The method of section A50, wherein the egress aggregation router removes a second label from the encapsulated data packets.

B1. A unified wide area network (WAN), comprising:
an aggregation router including a traffic steering module, wherein the traffic steering module encapsulates data packets and forwards an encapsulated data packet to a backbone router; and
the backbone router including a traffic engineering module, wherein the traffic engineering module sets a traffic engineered tunnel between the backbone router and a destination router for the encapsulated data packets.

B2. The unified WAN of section B1, wherein the unified WAN consists of plurality of sites.

B3. The unified WAN of section B2, wherein each site has an assigned static identifier called site label.

B4. The unified WAN of section B1, wherein the aggregation router and the backbone router reside on a same site.

B5. The unified WAN of any of the sections B1-B4, wherein the aggregation router runs Border Gateway Protocol (BGP).

B6. The unified WAN of section B5, wherein the BGP generates a full IP routing table on the aggregation router.

B7. The unified WAN of section B6, wherein the full IP routing table includes both Internet and datacenter routing tables.

B8. The unified WAN of any of the sections B5-B6, wherein the BGP on the aggregation router receives routes announced by at least one of a BGP route reflector, or a BGP client.

B9. The unified WAN of any of the sections B5-B8, wherein the BGP chooses a one or more equal-cost BGP next hops for each prefix in a routing table based on received routes.

B10. The unified WAN of section B9, wherein the one or more equal-cost BGP next hops are an egress aggregation router.

B11. The unified WAN of section B9, wherein the one or more equal-cost BGP next hops are beyond an egress aggregation router.

B12. The unified WAN of any of the sections B2-B11, wherein each unified WAN site includes plurality of aggregation routers and plurality of backbone routers.

B13. The unified WAN of any of the sections B2-B12, wherein the plurality of aggregation routers and the plurality of backbone routers are configured to route both inter-datacenter data packets and Internet data packets.

B14. The unified WAN of any of the sections B1-B13, wherein the backbone router to which the encapsulated data packet is forwarded to is selected based on weighted traffic steering route calculations by the traffic steering module.

B15. The unified WAN of section B14, wherein the weighted traffic steering route calculations are done by a unified WAN agent.

B16. The unified WAN of section B15, wherein the unified WAN agent runs as a process on the aggregation router.

B17. The unified WAN of any of the sections B15-B16, wherein the unified WAN agent communicates with a controller using a HTTPS server.

B18. The unified WAN of section B17, wherein the controller computes the weighted traffic steering route calculations for the unified WAN agent.

B19. The unified WAN of section B18, wherein the unified WAN agent further includes programming traffic steering routes on the aggregation router based on the weighted traffic steering route calculations of the controller.

B20. The unified WAN of section B19, wherein the controller excludes backbone routers with shortest path latency from the aggregation router to a destination site exceeding a best latency by a threshold, and then calculates weights using single commodity maximum flow from the aggregation router to the destination site.

B21. The unified WAN of any of the sections B1-B20, wherein the traffic steering module encapsulating a data packet having a destination further includes adding a first label to the data packet.

B22. The unified WAN of section B21, wherein the encapsulation is done by Multiprotocol Label Switching (MPLS).

B23. The unified WAN of any of the sections B21-B22, wherein the first label is an egress site label.

B24. The unified WAN of section B23, wherein the egress site label refers to backbone exiting site on a shortest path to the data packet's destination.

B25. The unified WAN of any of the sections B1-B24, wherein the traffic steering module encapsulating a data packet having a destination further includes adding a second label to the data packet.

B26. The unified WAN of section B25, wherein the second label is a node segment identifier (node SID).

B27. The unified WAN of section B26, wherein the node SID is a BGP next-hop.

B28. The unified WAN of any of the sections B1-B27, wherein the backbone router does not hold full IP routing table.

B29. The unified WAN of any of the sections B1-B28, wherein the traffic engineering module selects an optimized traffic engineered tunnel from two or more tunnels by performing traffic engineering optimization.

B30. The unified WAN of section B29, wherein the traffic engineering optimization includes measuring traffic matrix (TM) and network graph.

B31. The unified WAN of section B30, wherein the TM is a collection of traffic trunks and bandwidths for each trunk.

B32. The unified WAN of section B31, wherein the traffic trunk is an aggregate traffic flow from a source backbone router to a destination site for a specific traffic class.

B33. The unified WAN of section B32, wherein a traffic class is one of a voice, an interactive, a best-effort, and a scavenger.

B34. The unified WAN of any of the sections B30-B33, wherein the network graph is a dynamic topology consisting of sites, nodes and links.

B35. The unified WAN of section B34, wherein the nodes and the links have one or more attributes.

B36. The unified WAN of section B35, wherein the one or more attributes include at least one of a interface addresses, a device role, a link operation bandwidth, a bandwidth reserved for RSVP-TE, a link metric, information about whether a link or node should be avoided due to maintenance activity, and a link reliability information.

B37. The unified WAN of any of the sections B29-B36, wherein the traffic engineering optimization includes a path computation phase and an optimization phase.

B38. The unified WAN of section B37, wherein in the path computation phase further includes performing online computation of paths on a dynamic topology for all traffic trunks.

B39. The unified WAN of any of the sections B37-B38, wherein in the optimization phase a priority fairness optimization solver allocates traffic trunks to paths.

B40. The unified WAN of section B39, wherein in the priority fairness optimization solver further includes chaining two or more solvers in different combinations based on traffic class.

B41. The unified WAN of section B40, wherein in the two or more solvers include at least two of a max-min fairness solver, a minimize cost solver, a minimize maximum utilization solver, and a diverse path solver.

B42. The unified WAN of any of the sections B1-B41, wherein the backbone router further includes a unified WAN agent.

B43. The unified WAN of section B42, wherein the unified WAN agent further includes programming two or more traffic engineered routes on the backbone router on the traffic engineering module.

B44. The unified WAN of any of the sections B29-B43, wherein selecting the optimized traffic engineered tunnel from the two or more tunnels further includes the backbone router using an egress site label to determine one or more traffic engineered tunnels to use between the backbone router and the destination router, wherein the destination router is located at the egress site.

B45. The unified WAN of section B44, wherein the backbone router replaces the egress site label with the selected traffic engineered tunnel label.

B46. The unified WAN of section B45, wherein the backbone router forwards the encapsulated data packet to the destination router along the selected traffic engineered tunnel.

B47. The unified WAN of section B46, wherein the traffic engineered tunnel terminates at an egress backbone router.

B48. The unified WAN of section B47, wherein the egress backbone router performs segment routing using a second label.

B49. The unified WAN of section B48, wherein the egress backbone router removes the second label from the encapsulated data packets.

B50. The unified WAN of any of the sections B46-B49, wherein the traffic engineered tunnel terminates at an egress aggregation router.

B51. The unified WAN of section B50, wherein the egress aggregation router removes a second label from the encapsulated data packets.

C1. A method for routing data packet by an ingress backbone router, comprising:
  receiving (e.g., obtaining) encapsulated data packet having a first label and a second label, wherein the first label is an egress site label, and the second label is a node segment identifier (node SID);
  determining whether a traffic engineered tunnel to an egress site is available;
  when the traffic engineered tunnel to the egress site is available, replace the first label with the traffic engineered tunnel label and forward the encapsulated data packet along the traffic engineered tunnel; and
  when the traffic engineered tunnel to the egress site is not available, remove the first label and forward the encapsulated data packet using the node SID.

C2. The method of section C1, wherein the encapsulated data packet is received from an ingress aggregation router.

C3. The method of section C2, wherein the node SID is a BGP next-hop.

C4. The method of section C3, wherein the BGP next-hop is from a routing table stored in the ingress aggregation router.

C5. The method of any of the sections C2-C4, wherein the encapsulated data packet is encapsulated with Multiprotocol Label Switching (MPLS).

C6. The method of any of the sections C1-C5, wherein the ingress backbone router further includes a unified WAN agent.

C7. The method of section C6, wherein the unified WAN agent removes the first label when the traffic engineered tunnel is not available and the unified WAN agent replaces the first label with the traffic engineered tunnel when the traffic engineered tunnel is available.

D1. A method for routing data, comprising:
receiving an encapsulated data packet with a first label wherein the first label is an egress site label, wherein the encapsulated data packet has a destination;
selecting an optimized traffic engineered tunnel from two or more tunnels;
replacing the first label with the selected optimized traffic engineered tunnel; and
forwarding the encapsulated data packet along the selected optimized traffic engineered tunnel.

D2. The method of section D1, wherein the encapsulated data packet is received by an ingress backbone router from an ingress aggregation router.

D3. The method of any of the sections D1-D2, wherein the encapsulation is done by Multiprotocol Label Switching (MPLS).

D4. The method of any of the sections D1-D3, wherein the egress site label refers to backbone exiting site on a shortest path to the encapsulated data packet's destination.

D5. The method of any of the sections D1-D4, wherein the encapsulated data packet further includes a second label.

D6. The method of section D5, wherein the encapsulated data packet is forwarded to an egress backbone router.

D7. The method of section D5, wherein the second label is a node segment identifier (node SID).

D8. The method of section D7, wherein the node SID is a BGP next hop.

D9. The method of any of the sections D2-D8, wherein the method further includes routing data in a unified wide area network (WAN).

D10. The method of section D9, wherein the unified WAN consists of plurality of sites.

D11. The method of section D10, wherein each unified WAN site is assigned a site label.

D12. The method of any of the sections D10-D11, wherein each of the plurality of sites includes plurality of aggregation routers and plurality of backbone routers.

D13. The method of section D12, wherein the plurality of aggregation routers and the plurality of backbone routers are configured to route both inter-datacenter data packets and Internet data packets.

D14. The method of any of the sections D2-D13, wherein the ingress aggregation router holds full IP routing tables.

D15. The method of section D14, wherein the full IP routing tables includes both Internet and datacenter routing tables.

D16. The method of any of sections D14 and D15, wherein the full IP routing tables is generated by Border Gateway Protocol (BGP).

D17. The method of section D16, wherein the BGP on the ingress aggregation router receives routes announced by at least one of a BGP route reflector, or a BGP client.

D18. The method of section D17, wherein the BGP chooses a set of one or more equal-cost BGP next hops for each prefix in a routing table based on received routes.

D19. The method of section D18, wherein the set of one or more equal-cost BGP next hops are an egress aggregation router.

D20. The method of section D18, wherein the set of one or more equal-cost BGP next hops are endpoint beyond an egress site in legacy portions of WANs.

D21. The method of section D10, wherein the ingress aggregation router and the ingress backbone router reside on same WAN site.

D22. The method of any of the sections D2-D21, wherein the ingress backbone router to which the encapsulated data packet is forwarded to is selected based on weighted traffic steering route calculations by the ingress aggregation router.

D23. The method of section D22, wherein the weighted traffic steering route calculations are done by unified WAN agent that runs as a process on the ingress aggregation router.

D24. The method of section D23, wherein the unified WAN agent communicates with a controller using a HTTPS server.

D25. The method of section D24, wherein the controller computes the weighted traffic steering route calculations for the unified WAN agent.

D26. The method of section D25, wherein the unified WAN agent programs the weighted traffic steering routes on the ingress aggregation router based on the weighted traffic steering route calculations of the controller.

D27. The method of section D26, wherein the controller excludes ingress backbone routers with shortest path latency from the ingress aggregation router to an egress site exceeding a best latency by a threshold, and then calculates weights using single commodity maximum flow from the ingress aggregation router to the egress site.

D28. The method of any of the sections D2-D27, wherein the ingress backbone router does not hold full IP routing tables.

D29. The method of any of the sections D2-D28, wherein selecting the optimized traffic engineered tunnel from the two or more tunnels further includes the ingress backbone router performing a traffic engineering optimization.

D30. The method of section D29, wherein the traffic engineering optimization includes measuring traffic matrix (TM) and network graph.

D31. The method of section D30, wherein the traffic matrix is a collection of traffic trunks and bandwidths for each trunk.

D32. The method of section D31, wherein a traffic trunk is an aggregate traffic flow from the ingress backbone router to a destination site for a traffic class.

D33. The method of section D32, wherein the traffic class is one of a voice, an interactive, a best-effort, and a scavenger.

D34. The method of section D30, wherein the network graph is a dynamic topology consisting of sites, nodes and links.

D35. The method of section D34, wherein the nodes and the links have one or more attributes.

D36. The method of section D35, wherein the one or more attributes is one of a interface address, a device role, a link operational bandwidth, a bandwidth reserved for RSVP-TE, a link metric, an information about whether or not a link or a node should be avoided, and a link reliability information.

D37. The method of section D29, wherein the traffic engineering optimization includes a path computation phase and an optimization phase.

D38. The method of section D37, wherein in path computation phase online computation of paths on a dynamic topology for all traffic trunks is performed.

D39. The method of section D38, wherein in the optimization phase a priority fairness optimization solver allocates the traffic trunks to the paths.

D40. The method of section D38, wherein each traffic trunk is optimized differently.

D41. The method of section D39, wherein the priority fairness optimization solver further includes chaining four solvers in different combinations based on traffic classes.

D42. The method of section D41, wherein the four solvers include a max-min fairness solver, a minimize cost solver, a minimize maximum utilization solver, and a diverse path solver.

D43. The method of any of the sections D29-D42, wherein the ingress backbone router further includes a unified WAN agent.

D44. The method of section D43, wherein the unified WAN agent further includes programming two or more traffic engineered tunnels on the ingress backbone router based on the traffic engineering optimization.

D45. The method of any of the sections D2-D44, wherein selecting the optimized traffic engineered tunnel from the two or more tunnels further includes the ingress backbone router using the egress site label to determine one or more tunnels between the ingress backbone router and an egress backbone router wherein the egress backbone router is located at an egress site.

D46. The method of section D45, wherein forwarding the encapsulated data packet along the selected optimized traffic engineered tunnel further includes the ingress backbone router forwarding the encapsulated data packet to the egress backbone router using the selected optimized traffic engineered tunnel.

D47. The method of section D46, wherein the selected optimized traffic engineered tunnel terminates at the egress backbone router.

D48. The method of section D47, wherein the egress backbone router performs segment routing using a second label.

D49. The method of section D48, wherein the egress backbone router removes the second label from the encapsulated data packet.

D50. The method of section D46, wherein the selected optimized traffic engineered tunnel terminates at an egress aggregation router.

D51. The method of section D50, wherein the egress aggregation router removes a second label from the encapsulated data packet.

One or more specific embodiments of the present disclosure are described herein. These described embodiments are examples of the presently disclosed techniques. Additionally, in an effort to provide a concise description of these embodiments, not all features of an actual embodiment may be described in the specification. It should be appreciated that in the development of any such actual implementation, as in any engineering or design project, numerous embodiment-specific decisions will be made to achieve the developers' specific goals, such as compliance with system-related and business-related constraints, which may vary from one embodiment to another. Moreover, it should be appreciated that such a development effort might be complex and time consuming, but would nevertheless be a routine undertaking of design, fabrication, and manufacture for those of ordinary skill having the benefit of this disclosure.

The articles "a," "an," and "the" are intended to mean that there are one or more of the elements in the preceding descriptions. The terms "comprising," "including," and "having" are intended to be inclusive and mean that there may be additional elements other than the listed elements. Additionally, it should be understood that references to "one embodiment" or "an embodiment" of the present disclosure are not intended to be interpreted as excluding the existence of additional embodiments that also incorporate the recited features. For example, any element described in relation to an embodiment herein may be combinable with any element of any other embodiment described herein. Numbers, percentages, ratios, or other values stated herein are intended to include that value, and also other values that are "about" or "approximately" the stated value, as would be appreciated by one of ordinary skill in the art encompassed by embodiments of the present disclosure. A stated value should therefore be interpreted broadly enough to encompass values that are at least close enough to the stated value to perform a desired function or achieve a desired result. The stated values include at least the variation to be expected in a suitable manufacturing or production process, and may include values that are within 5%, within 1%, within 0.1%, or within 0.01% of a stated value.

A person having ordinary skill in the art should realize in view of the present disclosure that equivalent constructions do not depart from the spirit and scope of the present disclosure, and that various changes, substitutions, and alterations may be made to embodiments disclosed herein without departing from the spirit and scope of the present disclosure. Equivalent constructions, including functional "means-plus-function" clauses are intended to cover the structures described herein as performing the recited function, including both structural equivalents that operate in the same manner, and equivalent structures that provide the same function. It is the express intention of the applicant not to invoke means-plus-function or other functional claiming for any claim except for those in which the words 'means for' appear together with an associated function. Each addition, deletion, and modification to the embodiments that falls within the meaning and scope of the claims is to be embraced by the claims.

The terms "approximately," "about," and "substantially" as used herein represent an amount close to the stated amount that still performs a desired function or achieves a desired result. For example, the terms "approximately," "about," and "substantially" may refer to an amount that is within less than 5% of, within less than 1% of, within less than 0.1% of, and within less than 0.01% of a stated amount. Further, it should be understood that any directions or reference frames in the preceding description are merely relative directions or movements. For example, any references to "up" and "down" or "above" or "below" are merely descriptive of the relative position or movement of the related elements.

The present disclosure may be embodied in other specific forms without departing from its spirit or characteristics. The described embodiments are to be considered as illustrative and not restrictive. The scope of the disclosure is, therefore, indicated by the appended claims rather than by the foregoing description. Changes that come within the meaning and range of equivalency of the claims are to be embraced within their scope.

What is claimed is:

1. A unified wide area network (WAN), comprising:
an aggregation router including a traffic steering module, wherein the traffic steering module encapsulates a data packet with an egress site label and a node segment identifier (node SID), resulting in an encapsulated data packet; and a backbone router including a traffic engineering module, wherein the backbone router receives the encapsulated data packet and, when a traffic engineered tunnel to an egress site associated with the egress site label is available, the traffic engineering module replaces the egress site label with the traffic engineered tunnel, and when the traffic engineered tunnel to the egress site is not available, the traffic engineering module strips the egress site label from the encapsulated data packet.

2. A method for routing data using the unified WAN of claim 1, comprising:

forwarding the encapsulated data packet along the optimized traffic engineered tunnel or using the node SID.

3. The unified WAN of claim 1, wherein the backbone router includes an ingress backbone router and the aggregation router includes an ingress aggregation router.

4. The unified WAN of claim 3, wherein the ingress backbone router to which the encapsulated data packet is forwarded is selected based on weighted traffic steering route calculations by the ingress aggregation router.

5. The unified WAN of claim 3, wherein the optimized traffic engineered tunnel is selected from two or more tunnels, and wherein the ingress backbone router uses the egress site label to determine one or more tunnels between the ingress backbone router and an egress backbone router wherein the egress backbone router is located at the egress site.

6. The unified WAN of claim 5, wherein the encapsulated data packet is forwarded along the optimized traffic engineered tunnel further includes by the ingress backbone router forwarding the encapsulated data packet to the egress backbone router using the optimized traffic engineered tunnel.

7. The unified WAN of claim 6, wherein the traffic engineered tunnel terminates at the egress backbone router.

8. The unified WAN of claim 7, wherein the egress backbone router performs segment routing using the node SID.

9. The unified WAN of claim 1, wherein the backbone router is selected based on weighted traffic steering route calculations by the traffic steering module.

10. The unified WAN of claim 1, wherein the traffic engineering module selects an optimized traffic engineered tunnel from two or more tunnels by performing traffic engineering optimization.

11. The unified WAN of claim 10, wherein selecting the optimized traffic engineered tunnel from the two or more tunnels further includes the backbone router using the egress site label to determine one or more traffic engineered tunnels to use between the backbone router and the destination router, wherein the destination router is located at the egress site.

12. The unified WAN of claim 1, wherein the aggregation router includes a full IP routing table.

13. The unified WAN of claim 12, wherein the full IP routing table includes internet routing tables and datacenter routing tables.

14. The unified WAN of claim 12, wherein the aggregation router includes a Border Gateway Protocol (BGP).

15. The unified WAN of claim 1, wherein the backbone router operates as a forwarding only node.

16. The unified WAN of claim 1, wherein the backbone router includes ternary content-addressable memories (TCAMS).

17. The unified WAN of claim 1, wherein the aggregation router and the backbone router are located at the same site.

18. The unified WAN of claim 1, wherein the node SID is a Border Gateway Protocol (BGP) next-hop from a routing table stored in the aggregation router.

19. The unified WAN of claim 1, wherein the backbone router does not run Border Gateway Protocol (BGP).

* * * * *